(12) United States Patent
Gaiduchenko et al.

(10) Patent No.: US 11,212,331 B1
(45) Date of Patent: Dec. 28, 2021

(54) TRIGGERING CHANGES TO REAL-TIME SPECIAL EFFECTS INCLUDED IN A LIVE STREAMING VIDEO

(71) Applicant: Snap Inc., Santa Monica, CA (US)

(72) Inventors: Artem Gaiduchenko, Marina del Rey, CA (US); Artem Yerofieiev, Marina del Rey, CA (US); Bohdan Pozharskyi, Venice, CA (US); Gabriel Lupin, Marina del Rey, CA (US); Oleksii Kholovchuk, Marina del Rey, CA (US); Travis Chen, Los Angeles, CA (US); Yurii Monastyrshyn, Santa Monica, CA (US); Denys Makoviichuk, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/264,515

(22) Filed: Jan. 31, 2019

Related U.S. Application Data

(60) Provisional application No. 62/751,365, filed on Oct. 26, 2018.

(51) Int. Cl.
*H04L 29/06* (2006.01)

(52) U.S. Cl.
CPC ........ *H04L 65/602* (2013.01); *H04L 65/4069* (2013.01)

(58) Field of Classification Search
CPC .......................... H04L 65/602; H04L 65/4069
See application file for complete search history.

(56) References Cited

U.S. PATENT DOCUMENTS

| | | | |
|---|---|---|---|
| 6,317,127 B1* | 11/2001 | Daily | G06T 15/10 345/629 |
| 9,754,397 B1* | 9/2017 | Piemonte | G06Q 20/123 |
| 10,498,794 B1* | 12/2019 | Keighran | A63F 13/00 |
| 10,569,174 B1* | 2/2020 | Wheeler | A63F 13/533 |
| 2007/0040850 A1* | 2/2007 | Coleman | H04M 1/72547 345/629 |
| 2013/0281208 A1* | 10/2013 | Lyons | G07F 17/3211 463/33 |
| 2014/0281014 A1* | 9/2014 | Good | H04N 19/40 709/231 |

(Continued)

*Primary Examiner* — Azizul Choudhury
(74) *Attorney, Agent, or Firm* — Schwegman Lundberg & Woessner, P.A.

(57) ABSTRACT

Method for triggering changes to real-time special effects included in a live streaming video starts with a processor transmitting in real-time a video stream captured by a camera via a network. The processor causes a live streaming interface that includes the video stream to be displayed on the plurality of client devices. The processor receives a trigger to apply one of a plurality of special effects to the video stream and determines a first special effect of the plurality of special effects is associated with the trigger. The processor applies in real-time the first special effect to the video stream to generate a video stream having the first special effect and transmits in real-time the video stream having the first special effect via the network. The processor causes the live streaming interface that includes the video stream having the first special effect to be displayed on the plurality of client devices. Other embodiments are disclosed.

20 Claims, 13 Drawing Sheets

(56) References Cited

U.S. PATENT DOCUMENTS

| | | | |
|---|---|---|---|
| 2014/0347265 A1* | 11/2014 | Aimone | A61M 21/00 |
| | | | 345/156 |
| 2018/0068490 A1* | 3/2018 | Holmes | H04N 7/141 |
| 2018/0077469 A1* | 3/2018 | Geduldig | H04N 21/4622 |
| 2019/0228580 A1* | 7/2019 | Pelant | G06T 19/20 |
| 2019/0261025 A1* | 8/2019 | Hussain | H04N 21/25891 |
| 2019/0318543 A1* | 10/2019 | Skidmore | G06T 19/006 |

* cited by examiner

TRIGGERING CHANGES TO REAL-TIME SPECIAL EFFECTS INCLUDED IN A LIVE STREAMING VIDEO

CROSS REFERENCED TO RELATED APPLICATIONS

This claims priority to U.S. Provisional Patent Application Ser. No. 62/751,365, filed Oct. 26, 2018, the contents of which are incorporated herein by reference in their entirety.

BACKGROUND

The popularity of communicating using cameras continues to grow. Current mobile devices are equipped with cameras allowing users to communicate with each other using video messaging applications rather than simply voice calling or text messaging. These video messaging applications allow the users to have conversations on a one-to-one or even on a one-to-many basis in real-time using their cameras.

Increasingly, users also communicate on a one-to-many basis by live streaming themselves using live streaming video platforms. In the video gaming world, users (e.g., gamers) using webcams or built-in cameras on their desktops or laptops are able to provide a live stream of themselves playing a video game to an audience via the Internet. Gaming platforms report over a 100 million monthly active users with an average audience viewing time of 106 minutes per user per day.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve live streaming platforms by providing augmented reality (AR) experiences to the live streaming videos on these platforms. In one embodiment, a virtual camera system is used to set up a virtual camera client application on a client device (e.g., a personal computer, a desktop, a laptop, etc.) that enables the application of lenses to a video stream that can be transmitted in real-time to a plurality of viewers' client devices via a network. The lenses apply real-time special effects and/or sounds the live streaming video.

In one embodiment, the virtual camera system receives a trigger to apply a lens to the video stream. The trigger may be received when the user selects the lens to be applied to his live video stream. In one embodiment, the trigger is received when an input from a viewer of the live streaming video is detected. The input from the viewer may be a selection of a display item in the live streaming interface which is associated with a lens to be applied in real time. In one embodiment, the trigger is received from a third-party application such as an email application, a messaging application, a telephone application, or a video game. The trigger may be generated by the third-party application based on an occurrence within the third-party application.

By allowing live streaming users to apply lenses in real-time to live video streams, the virtual camera system provides the live streaming user with the ability to customize their live video streams to render the streams more engaging to their viewers and provides the live streaming user with a new way to communicate with his viewers during his live streaming. By allowing viewers to apply lenses in real-time to live video streams, the system also provides the viewers with a new way to engage and communicate with the live streaming user.

Accordingly, the virtual camera system provides functionalities that increase the user engagement with the live streaming video platforms as well as the virtual camera system itself such that length of time the users maintain presence on the platforms and system will increase.

Figure 1:
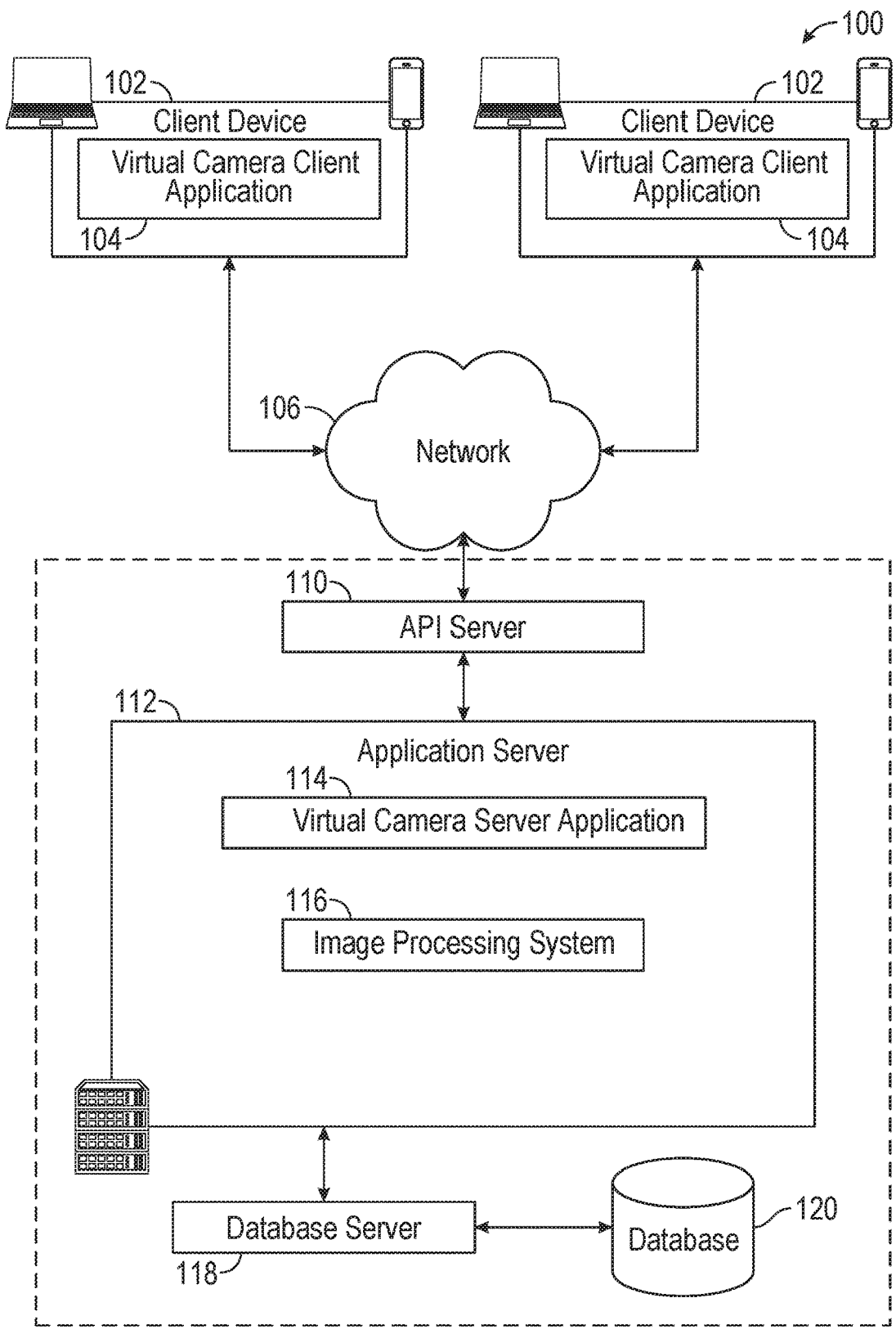
FIG. 1 is a block diagram showing an example virtual camera system for triggering changes to real-time special effects included in a live streaming video over a network.

FIG. 1 is a block diagram showing an example virtual camera system 100 for triggering changes to real-time special effects included in a live streaming video over a network. The virtual camera system 100 includes multiple client devices 102, each of which hosts a number of applications including a virtual camera client application 104. While not illustrated in FIG. 1, each of the client devices 102 may host applications including communication applications and may be communicatively coupled with camera devices and display devices. Further details of the client devices 102 are discussed with reference to FIG. 6 and FIG. 7.

As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

The communication applications hosted on the client devices 102 may be video messaging applications or applications that support live streaming video platforms. The communication applications are communicatively coupled to the camera device that may be an image-capturing device, such as a digital camera for generating digital images and/or video. The camera device may be built into the client device 102 or may be an external digital camera. The camera device may be a forward-facing camera that captures an image or video of the user of the client device 102 (e.g., webcam).

In one embodiment, the communication applications hosted on the client devices 102 are video messaging applications that allow the users of the client devices 102 to communicate using live video captured using the camera devices of the client devices 102. In this embodiment, each of the communication applications is communicatively coupled when a communication session is established between the communication applications. When a communication session is established, the camera devices capture a live video of the user of the client devices 102, respectively. The communication applications may also transmit the live video captured by their respective camera devices to each other. For instance, the communication application in a first client device 102 transmits the live video captured by the camera device of the first client device 102 to another communication application hosted on a second client device 102. Similarly, the communication application in the second client device 102 transmits the live video captured by the camera device of the second client device 102 to the communication application hosted on the first client device 102.

In some embodiments, the display devices included in the client device 102 generates user interfaces that includes both the transmitted and received live videos. Display devices may be display screens that are internal or external to the client devices 102. For example, the user interface being displayed on the first client device 102 may include the live video of the user of the first client device 102 as well as the live video of the user of the second client device 102. The live video of the user of the first client device 102 in this example may be displayed in a smaller portion (e.g., a preview or picture-in-picture) of the user interface while the live video of the user of the second client device 102 may be displayed in a prominent portion of the user interface.

In one embodiment, the communication applications hosted on the client devices 102 are applications that support live streaming video platforms. In this embodiment, the communication application in the client device 102 receives the live video from the camera device 101 of the client device 102 (e.g., live streaming user's client device 102) and transmits the live video as a live video stream to be displayed on a plurality of client devices 102 for users who are watching the live video in real-time (e.g., viewers).

In each client device 102, the communication application may be communicatively coupled to the virtual camera client application 104. The virtual camera client application 104 allows the user of the client device 102 to apply a lens to the live video captured by the camera device such that the virtual camera client application 104 may generate a live streaming video having real-time special effects. In one embodiment, the virtual camera client application 104 sets up a virtual camera on a personal desktop computer or laptop that applies lenses to a video stream that can be shared with viewers using other client devices 102. The special effects that the lenses apply to the live video stream include special effects to audio and/or visual content of the live video stream. Examples of special effects include overlaying colors, pictures, texts, logos, and animations. Effects may also include adding sound effects to the video stream such as adding sounds to the audio signal or altering the portions of the existing audio (e.g., voice signal modulations).

Figure 5A:
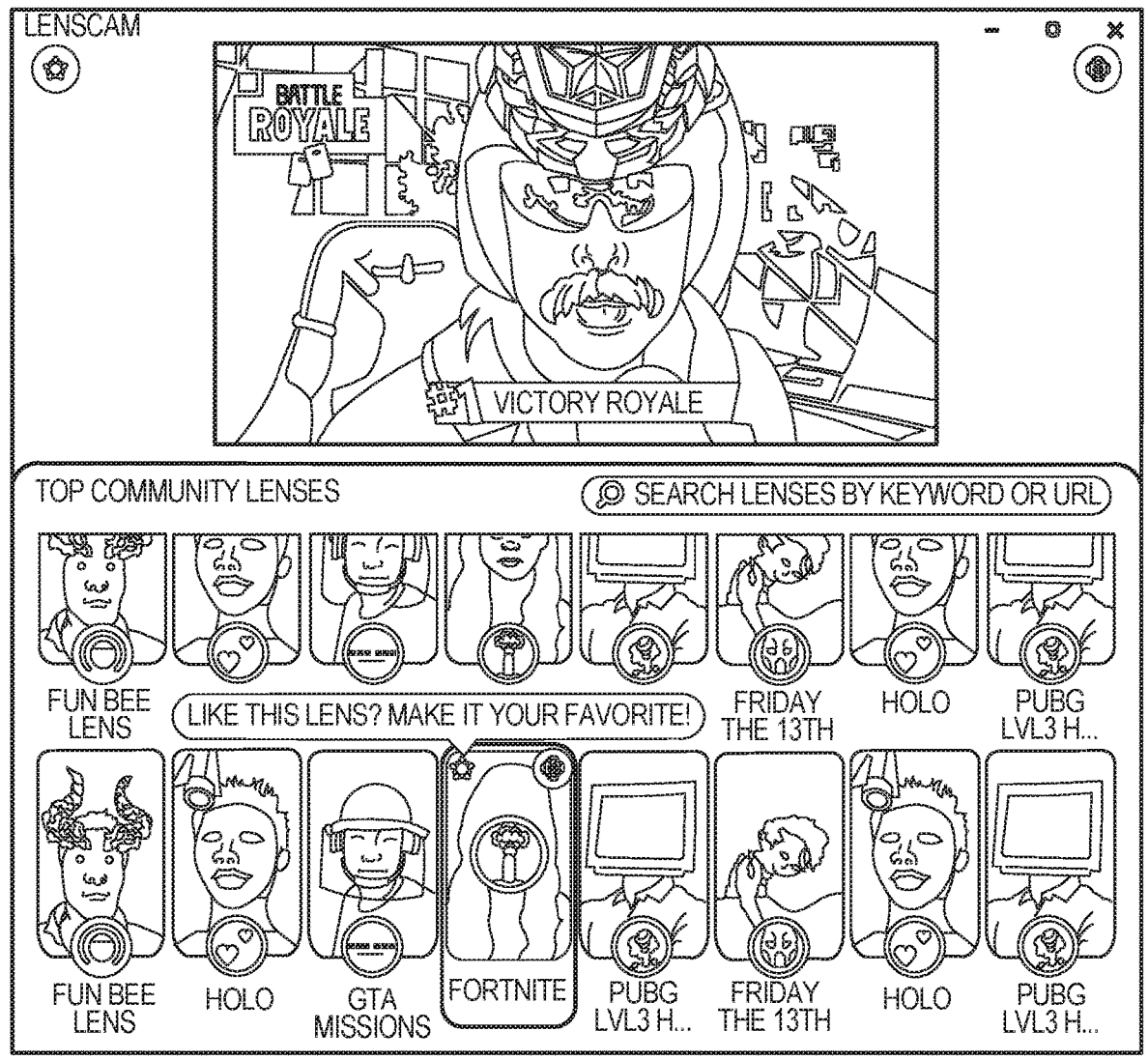
FIGS. 5A-5F are screenshots of exemplary user interfaces according to various aspects of the disclosure.
Figure 5B:
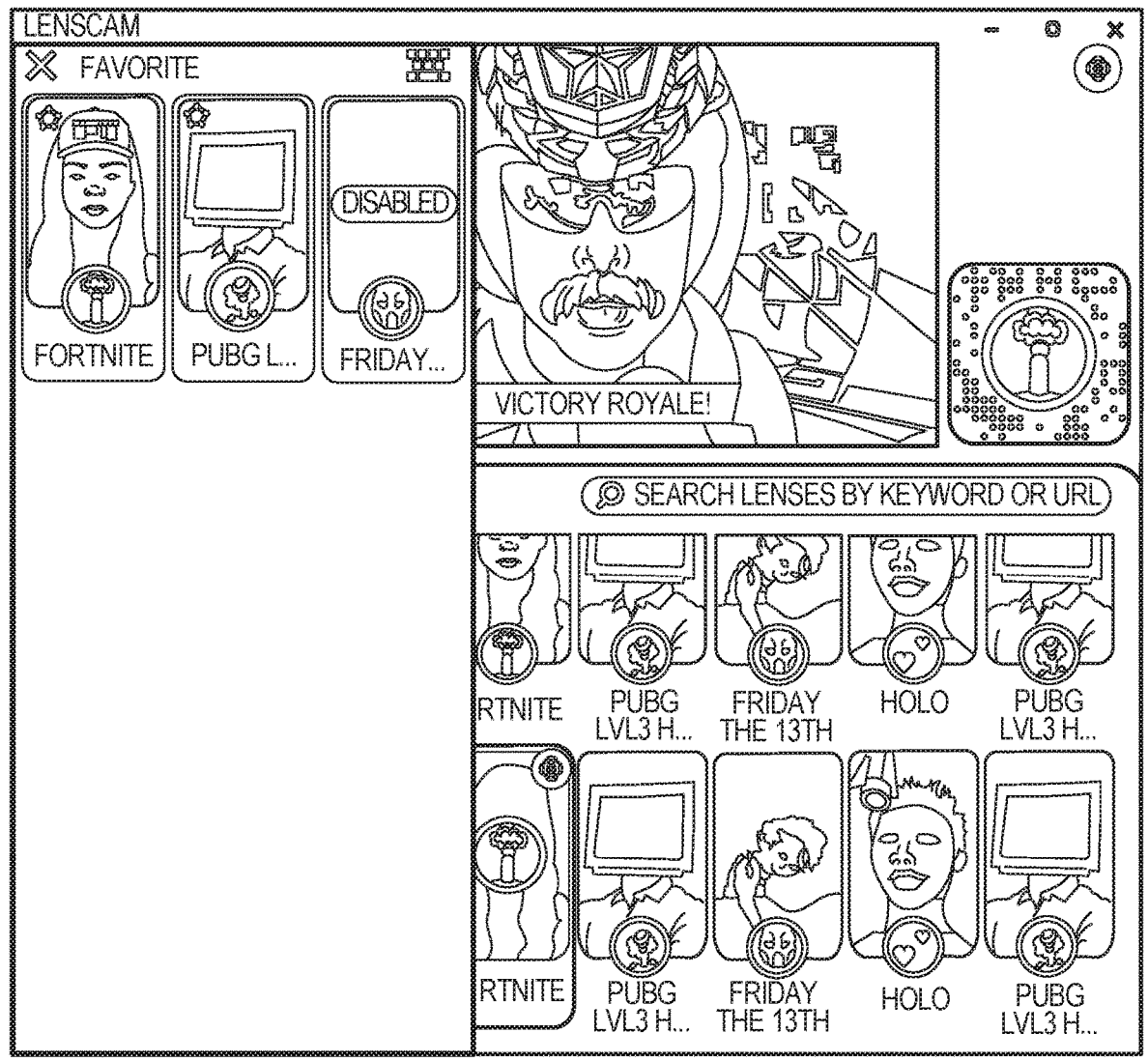
Figure 5C:
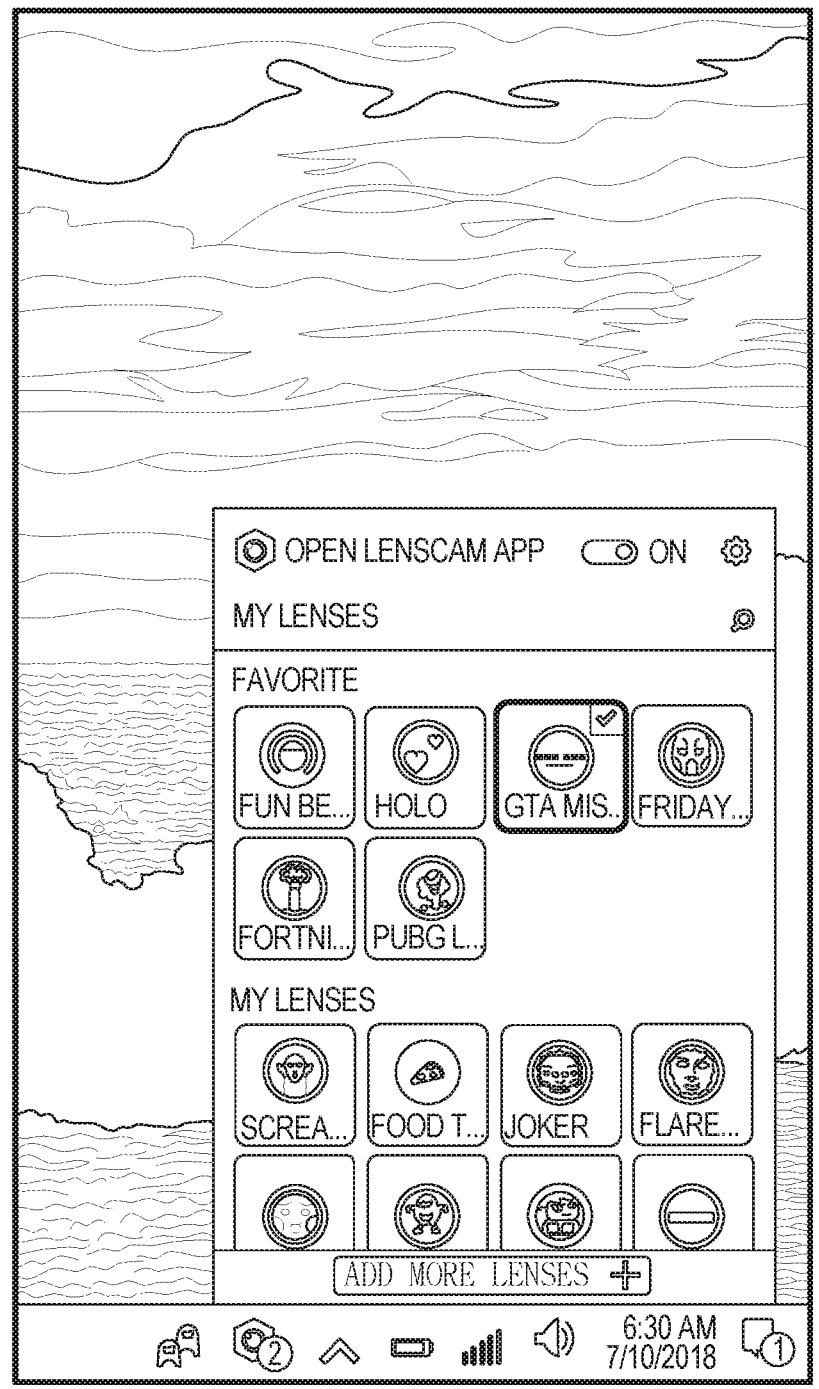
Figure 5D:
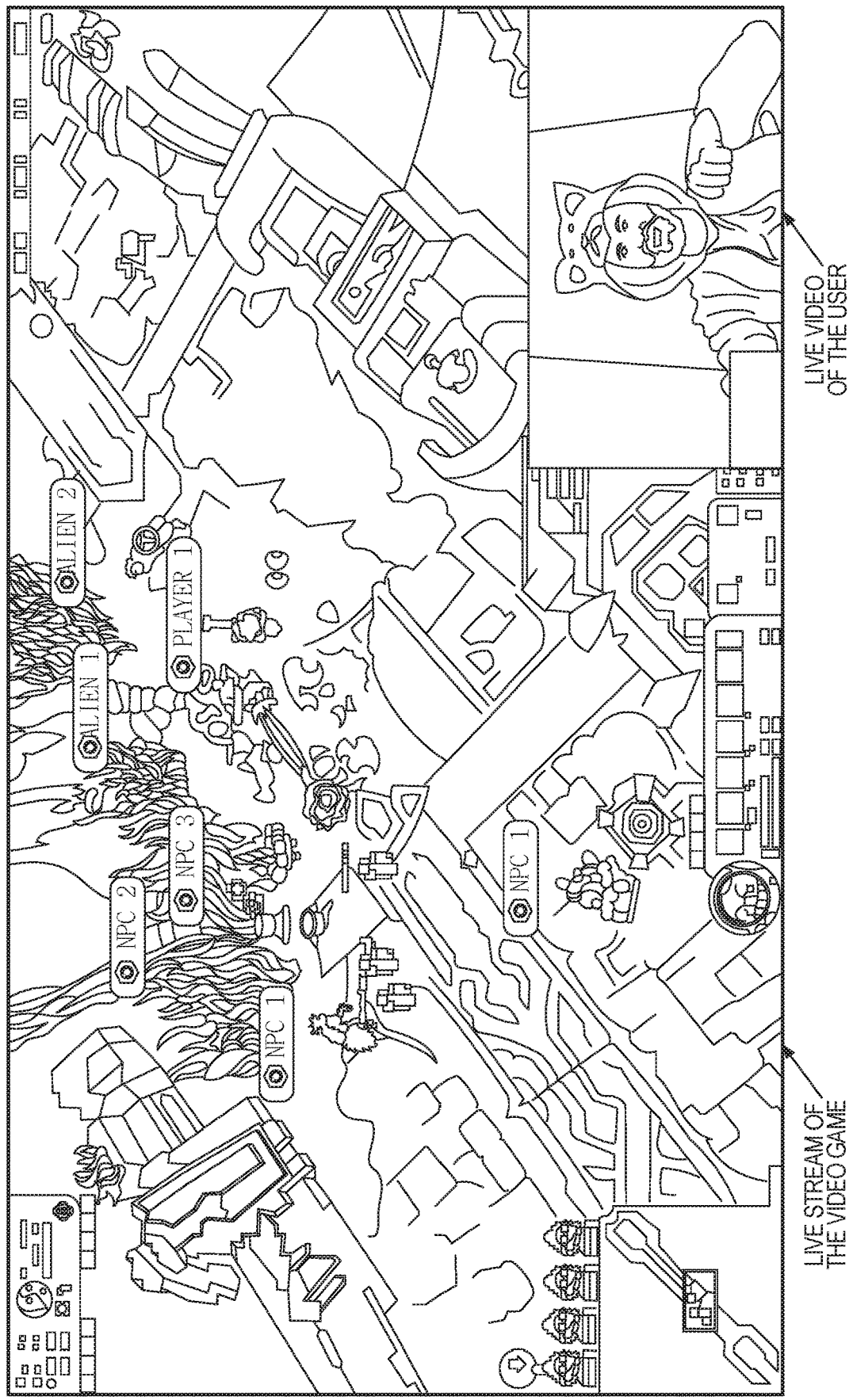
Figure 5E:
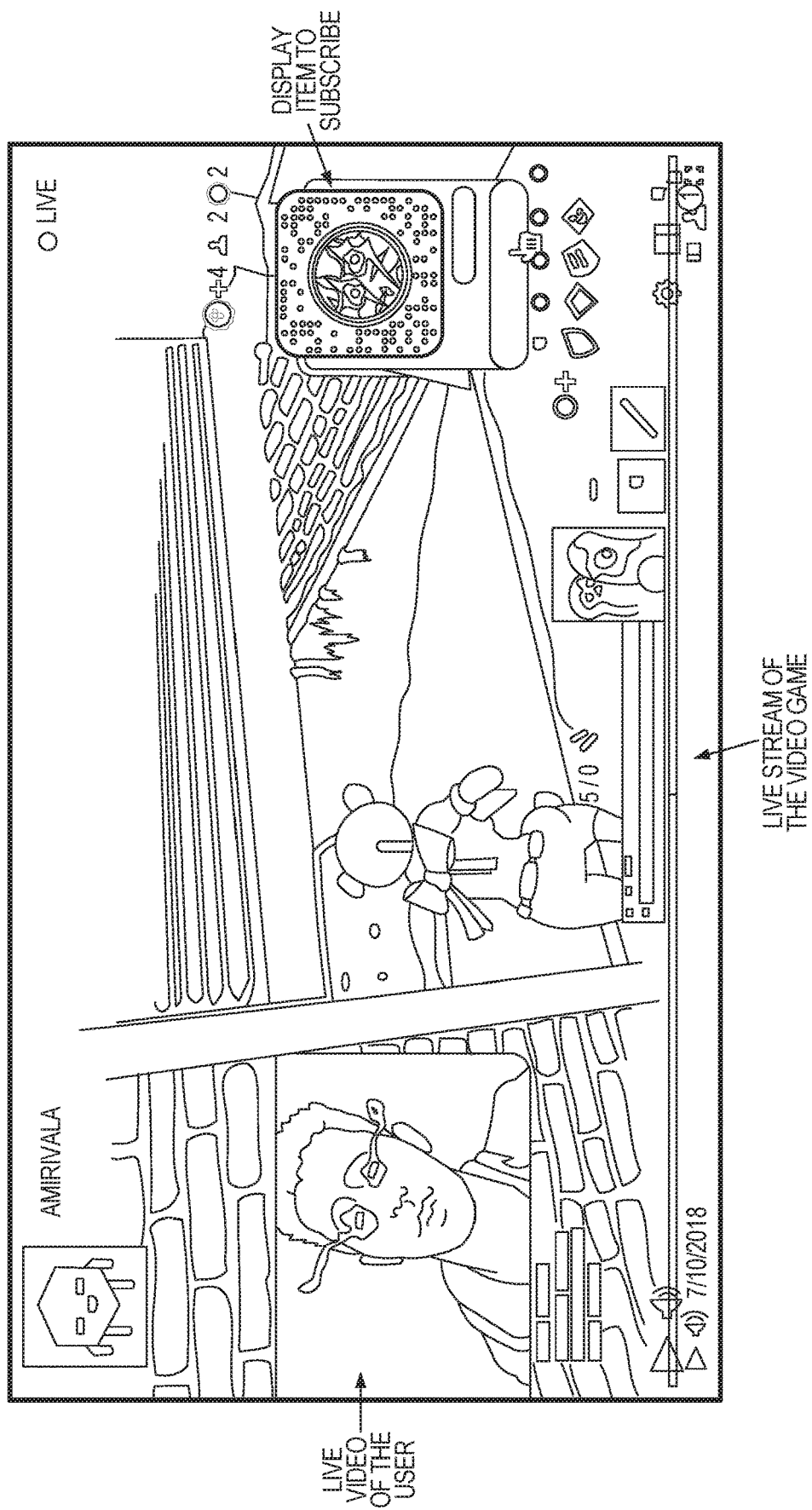
Figure 5F:
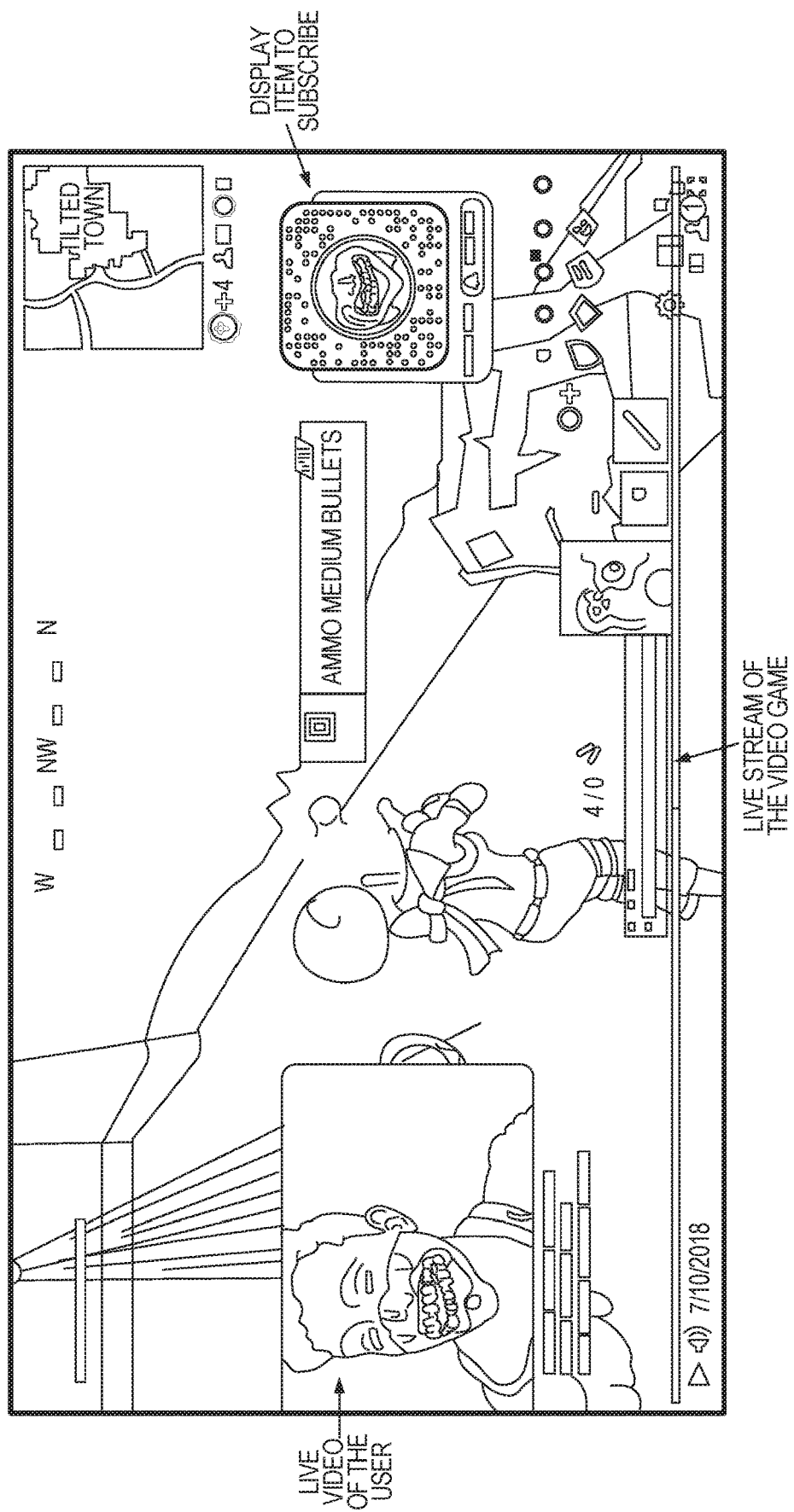

FIGS. 5D, 5E, and 5F are screenshots of exemplary user interfaces that are generated on the display device of the viewers' client devices 102. As shown in FIGS. 5D, 5E, and 5F, the exemplary user interfaces include the live video of the live streaming user as a picture-in-picture. In other embodiments, the user interface that is generated on the display device of the viewers' client devices 102 includes the live video of the live streaming user as the main portion of the user interface. For example, the live video of the live streaming user may be displayed in full screen mode. In the examples in FIGS. 5D, 5E, and 5F, the main portion of the exemplary user interfaces include a live stream of the video game that the live streaming user is playing in real-time.

In FIGS. 5D, 5E, and 5F, a different lens is being applied to each of the live videos of the live streaming user. In FIG. 5D, the special effect of the lens is a bear-ears hood or hat that is applied to the user's head (e.g., bear-ears hood lens). The lens in FIG. 5D tracks the location of the user's head and applies the digital bear-ears hood to generate a live streaming video that makes the live streaming user look like he is wearing the digital bear-ears hood. The special effect of the lens in FIG. 5E is digital lightning bolts being applied to the live streaming user's eyes and the special effect of the lens in FIG. 5F is a digital mask being applied to the bottom half of the live streaming user's face and red eye effects being applied to the live streaming user's eyes. In both FIG. 5E and FIG. 5F, the lenses track the location of the live streaming user's face and eyes to apply the special effects, respectively.

The virtual camera client application 104 also provides the user access to a collection of digital lenses. Each of the lenses may apply different real-time special effects and/or sounds to the video that is captured. The virtual camera client application 104 is communicatively coupled to the video communication application on the client device 102 to apply a digital lens to the live video being captured by the camera device and transmitted to at least one other client device 102. The digital lens is applied to modify the video stream transmitted by the first client device 102 to the at least one other client device 102 while the video stream is being captured (e.g., modifying a video stream in real time).

In FIGS. 5A-5C, screenshots of exemplary user interfaces that are generated on the display device of the client device 102 as illustrated. As shown in FIG. 5A, the user interface includes the live video of the live streaming user in the top portion of the interface and a lens selection user interface at the bottom portion of the interface. The lens selection user interface includes a collection of lenses that may be selected by the user. The user selects the lens to be applied to his live video by selecting one of the selectable thumbnails (e.g., lens selections) in FIG. 5A. Each of the selectable thumbnails, as shown in FIG. 5A, may include previews of the special effect associated with the lens. The user may also search for specific lenses in the collection of lenses using a search function (e.g., text search). As shown in FIG. 5B, the user may also set the lenses he uses most often or his preferred lenses as his favorite lenses. In one embodiment, the user may also customize the order in which the preferred lenses appear in the user interface. The user interface in FIG. 5B displays on the lens selection user interface the preferred lens selections. In one embodiment, the preferred lens selections may be accessible via a tray activated user interface, as shown in FIG. 5C. The tray is a quickly accessible location on a display screen of the client device 102. In one embodiment, the tray includes an icon associated with the tray activated user interface. By selecting the icon, the tray activated user interface in FIG. 5C is caused to be generated on the client device 102. The tray activated user interface may include icons or thumbnails associated with the preferred lens selections. In other embodiments, the tray activated user interface may also include icons or thumbnails associated with other lenses that are available to the user. For example, other lenses may include lenses that were recently activated or recently used. By selecting an icon or thumbnail associated with a desired lens, the user causes the desired lens to be applied to his live streaming video.

Each virtual camera client application 104 is communicatively coupled to a virtual camera server system 108 via a network 106 (e.g., the Internet). In the example shown in FIG. 1, each virtual camera client application 104 is able to communicate and exchange data with the virtual camera server system 108 via the network 106 (e.g., the Internet). The data exchanged between a virtual camera client application 104 and the virtual camera server system 108, includes functions (e.g., commands to invoke functions) as well as payload data (e.g., lenses, user identification, user preferences).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The virtual camera server system 108 provides server-side functionality via the network 106 to a particular virtual camera client application 104. While certain functions of the virtual camera system 100 are described herein as being performed by either a virtual camera client application 104 or by the virtual camera server system 108, it will be appreciated that the location of certain functionality either within the virtual camera client application 104 or the virtual camera server system 108 is a design choice. For example, it may be technically preferable to initially deploy certain technology and functionality within the virtual camera server system 108, but to later migrate this technology and functionality to the virtual camera client application 104 where a client device 102 has a sufficient processing capacity.

The virtual camera server system 108 supports various services and operations that are provided to the virtual camera client application 104. Such operations include transmitting data to, receiving data from, and processing data generated by the virtual camera client application 104. This data may include client device information, geolocation information, media annotation and overlays, user preferences, and social network information as examples. Data exchanges within the virtual camera system 100 are invoked and controlled through functions available via user interfaces (UIs) of the virtual camera client application 104.

Turning now specifically to the virtual camera server system 108, an Application Program Interface (API) server 110 is coupled to, and provides a programmatic interface to, an application server 112. The application server 112 is communicatively coupled to a database server 118, which facilitates access to a database 120 in which is stored data associated with lenses processed by the application server 112.

Dealing specifically with the Application Program Interface (API) server 110, this server receives and transmits lens data (e.g., functions and payloads data) between the client device 102 and the application server 112. Specifically, the Application Program Interface (API) server 110 provides a set of interfaces (e.g., routines and protocols) that can be called or queried by the virtual camera client application 104 in order to invoke functionality of the application server 112. The Application Program Interface (API) server 110 exposes various functions supported by the application server 112, including the download and usage of lenses, and the creation of lenses, via the application server 112, from a particular virtual camera client application 104, the sending of media files (e.g., live video) from a virtual camera client application 104 to the virtual camera server application 114, and for possible access by another virtual camera client application 104, the setting of favorite lenses by a virtual camera client application 104, the generation of a collection of lenses (e.g., including community lenses generated by the virtual camera server system 108 and lenses generated by users in the virtual camera system 100), the retrieval of a list of viewers or subscribers of a user of a client device 102, the retrieval of lens collections, the adding and deletion of users, viewers or subscribers to a social graph, and opening an application event (e.g., relating to the virtual camera client application 104).

The application server 112 hosts a number of applications and subsystems, including a virtual camera server application 114 and an image processing system 116. The virtual camera server application 114 implements a number of virtual camera processing technologies and functions, particularly related to the aggregation and other processing of lenses. The lenses from multiple sources may be aggregated into collections of lenses. These collections are then made available, by the virtual camera server application 114, to the virtual camera client application 104. Other processor and memory intensive processing of data may also be performed server-side by the virtual camera server application 114, in view of the hardware requirements for such processing.

The application server 112 also includes an image processing system 116 that is dedicated to performing various image processing operations, typically with respect to lenses received or generated at the virtual camera server application 114.

The application server 112 is communicatively coupled to a database server 118, which facilitates access to a database 120 in which is stored data associated with lenses processed by the virtual camera server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, and/or any other wearable devices.

Figure 2:
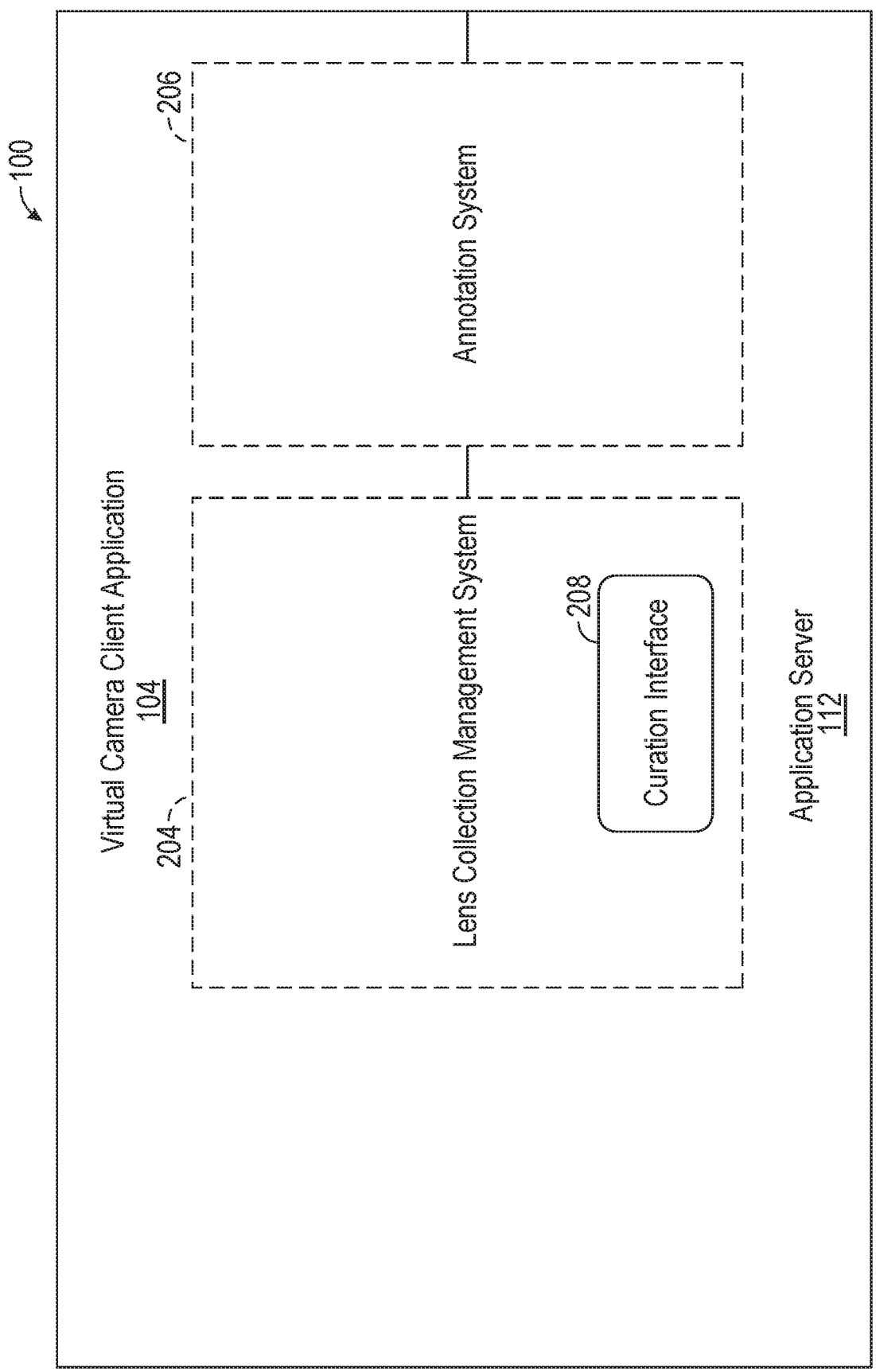
FIG. 2 is block diagram illustrating further details regarding the virtual camera system, according to exemplary embodiments.

FIG. 2 is block diagram illustrating further details regarding the virtual camera system 100, according to exemplary embodiments. Specifically, the virtual camera system 100 is shown to comprise the virtual camera client application 104 and the application server 112, which in turn embody a number of some subsystems, namely a lens collection management system 204 and an annotation system 206.

The collection management system 204 is responsible for managing collections of lenses. In some examples, a collection of lenses may be organized into related topics (e.g., sports teams, video game, location) or origin of the lens (e.g., community lens, user generated lens, etc.). The availability of the lens may be for a specified time period, such as the duration of an event to which the content relates, or a limited time frame set by the virtual camera system 100. For example, content relating to a video game tournament may be made available as a lens in the collection of lenses for the duration of that tournament. The availability of the lens may also be based on user or system monitoring. For example, if a lens is flagged for offensive content, the lens may be removed from the collection of lenses by the collection management system 204. The collection management system 204 may also be responsible for publishing an icon or thumbnail that provides notification of the existence of a particular lens to the lens selection user interface (e.g., FIG. 5A) of the virtual camera client application 104.

The collection management system 204 furthermore includes a curation interface 208 that allows a collection manager to manage and curate a particular collection of lenses. For example, the curation interface 208 enables an event organizer to curate a collection of lenses relating to a specific event (e.g., delete inappropriate content or redundant lenses). Additionally, the collection management system 204 employs machine vision (or image recognition technology) and content rules to automatically curate the collection of lenses.

The annotation system 206 provides various functions that enable a user to annotate or otherwise modify or edit a lens. For example, the annotation system 206 provides functions related to the generation and publishing of lenses processed by the virtual camera system 100. The annotation system 206 operatively supplies lenses based on a geolocation of the client device 102. In another example, the annotation system 206 operatively supplies lenses to the virtual camera client application 104 based on other information, such as, social network information of the user of the client device 102. The annotation system 206 may thus supply lenses based on other ranking or contextual signals. The lenses may be stored in the database 120 and accessed through the database server 118.

In one exemplary embodiment, the annotation system 206 provides a user-based publication platform that enables users to select a geolocation on a map, and upload lenses associated with the selected geolocation. The user may also specify circumstances under which a particular lens should be offered to other users. The annotation system 206 generates the lens based on the user's selections and associates the lens with the selected geolocation.

In another exemplary embodiment, the annotation system 206 provides a merchant-based publication platform that enables merchants to select a particular lens via a bidding process. For example, the annotation system 206 associates the lens of a highest bidding merchant for a predefined amount of time.

Figure 3:
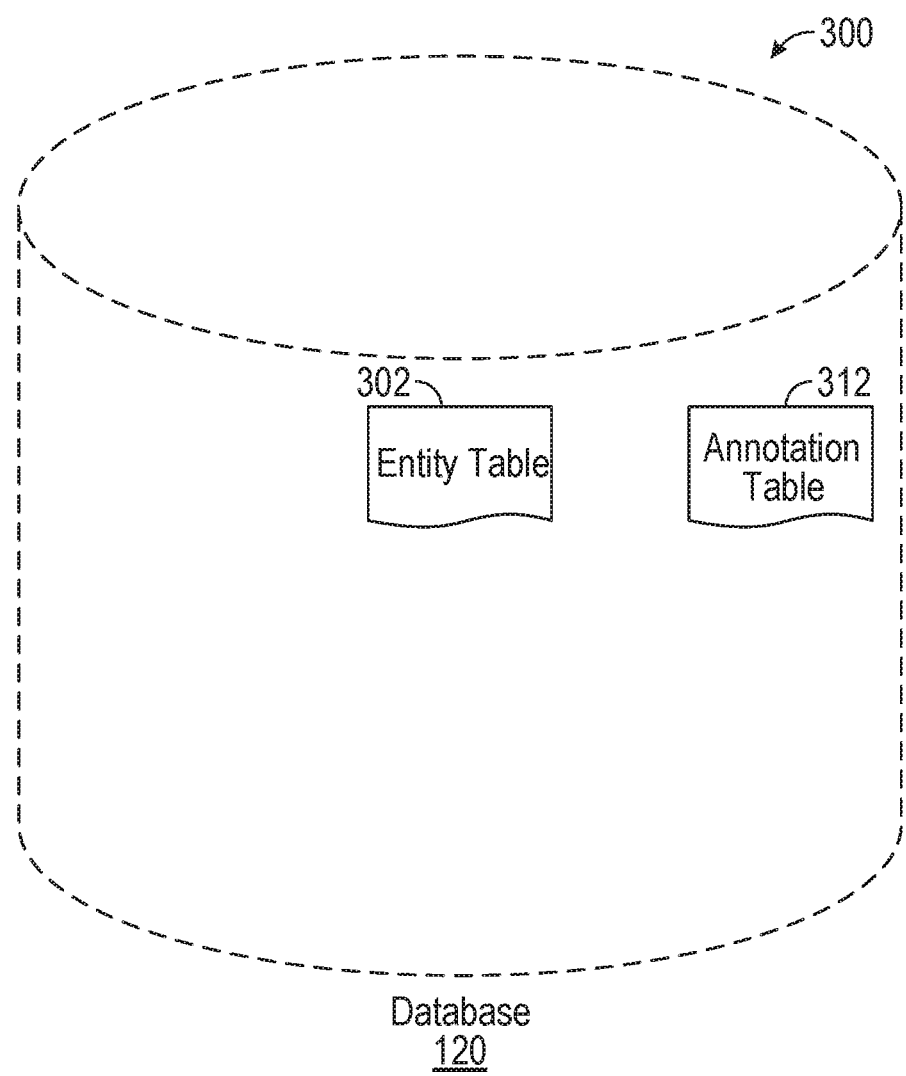
FIG. 3 is a schematic diagram illustrating data which may be stored in the database of the virtual camera system, according to various exemplary embodiments.

FIG. 3 is a schematic diagram 300 illustrating data 300 which may be stored in the database 120 of the virtual camera server system 108, according to certain exemplary embodiments. While the content of the database 120 is shown to comprise a number of tables, it will be appreciated that the data could be stored in other types of data structures (e.g., as an object-oriented database).

The database 120 includes an entity table 302 that stores entity data. Entities for which records are maintained within the entity table 302 may include individuals, corporate entities, organizations, objects, places, events etc. Regardless of type, any entity regarding which the virtual camera server system 108 stores data may be a recognized entity. Each entity is provided with a unique identifier, as well as an entity type identifier (not shown).

The database 120 also stores annotation data in an annotation table 312. Annotation data that may be stored within the image table 308 includes the "lens" data related to the real-time special effect and sound that may be added to a live streaming video.

Lenses for which data is stored within the annotation table 312 are associated with and applied to live videos. Lenses may be of various types, including a user-selected lenses from a collection of lenses presented to a sending user (e.g., live streaming user) by the virtual camera client application 104 (e.g., FIG. 5A). Types of lenses may include geolocation lenses that are presented to a sending user in the collection of lenses based on geographic location. For example, geolocation lenses specific to a neighborhood or special location may be presented within a user interface by the virtual camera client application 104, based on geolocation information determined by a GPS unit of the client device 102. Another type of lens is a data lens, which may be selectively presented to a sending user by the virtual camera client application 104, based on other inputs or information gathered by the client device 102. Example of data lens include current temperature at a specific location, a current speed at which a sending user is traveling, the current time, or identification of other applications (e.g., video games). For example, the lens may be a lens specific to a video game the sending user plays and live streams to an audience via the Internet.

Figure 4A:
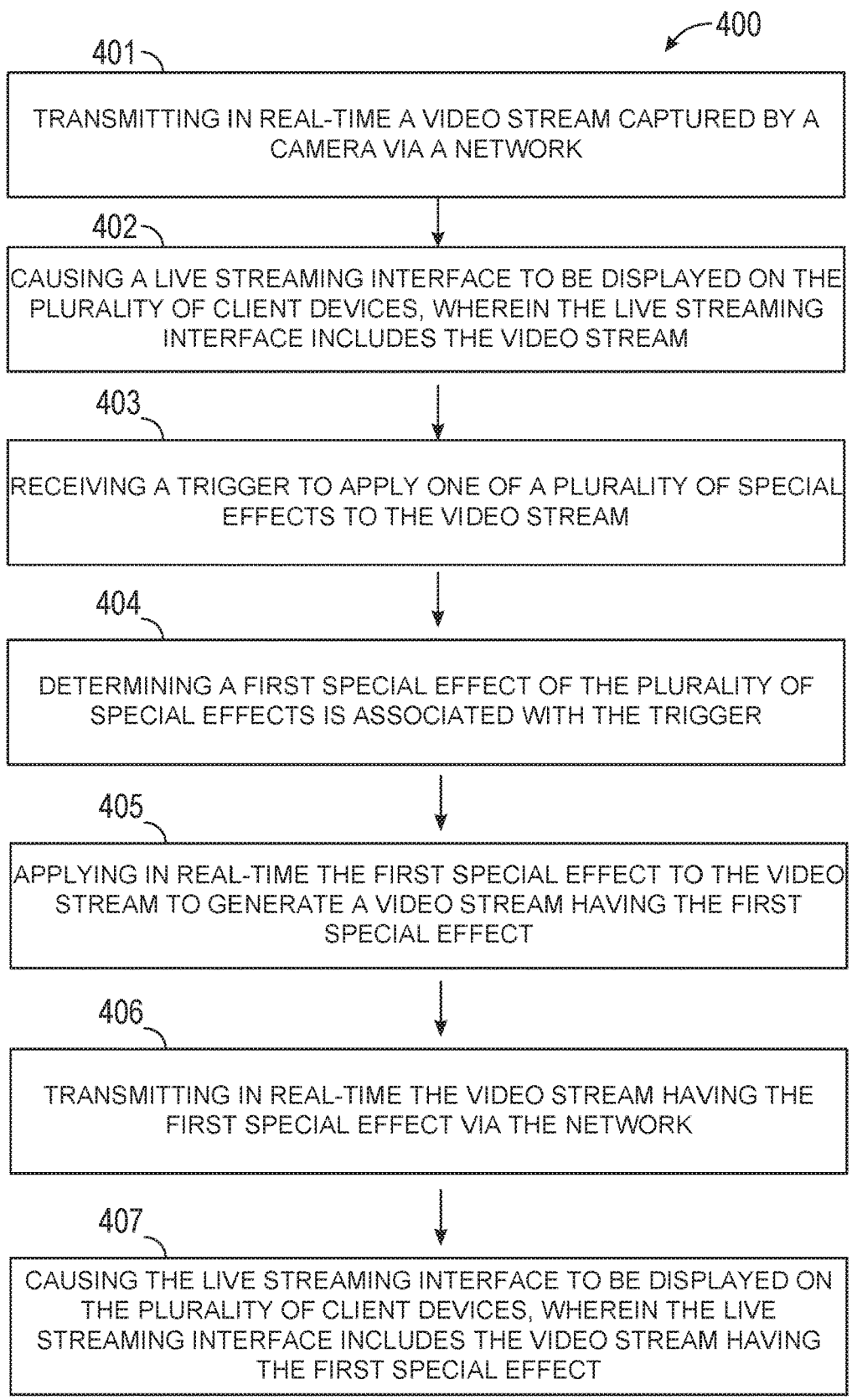
FIGS. 4A-4B are an exemplary flow diagrams of processes according to various aspects of the disclosure.
Figure 4B:
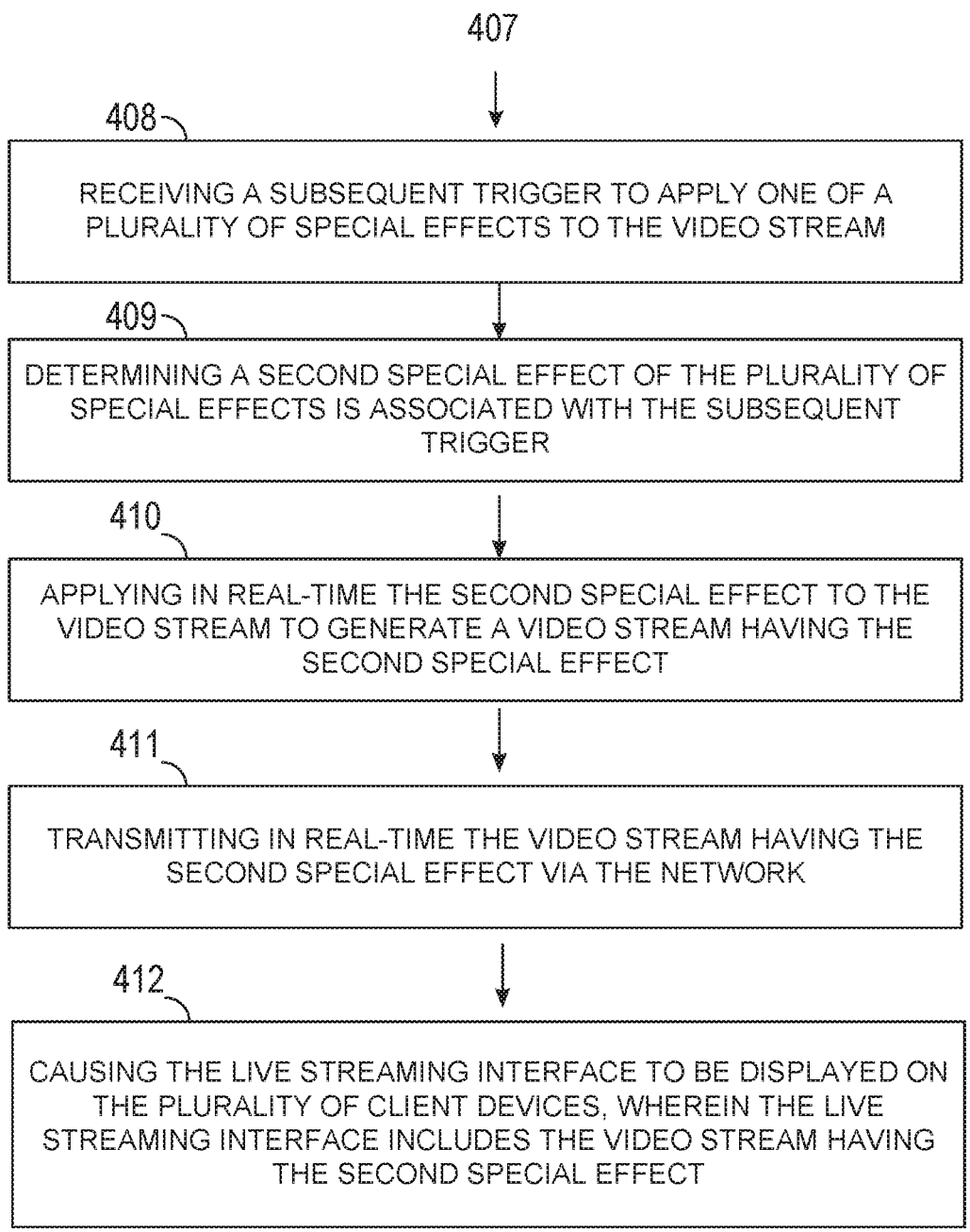

FIGS. 4A-4B are exemplary flow diagrams of processes according to various aspects of the disclosure. Although the flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of methods may be performed in whole or in part, may be performed in conjunction with some or all of the steps in other methods, and may be performed by any number of different systems, such as the systems described in FIG. 1 and/or FIG. 7.

FIG. 4A depicts an exemplary process of triggering changes to real-time special effects included in a live streaming video according to various aspects of the present disclosure. Method 400 may be performed by an application server of the virtual camera server system 108 and/or a processor of a client device 102. In this example, method 400 starts, at Block 401, with a processor of a client device 102 transmitting in real-time a live video stream captured by a camera via a network 106. For example, a live streaming user may be transmitting from his client device 102 a live stream video of himself playing a video game in real time. At Block 402, the processor causes a live streaming interface that includes the video stream to be displayed on the plurality of client devices. In this embodiment, the live streaming interface includes the live video stream that includes a live view of the live streaming user playing the video game and a live stream of the video game being played by the user. In one embodiment, the live video stream that includes a live view of the live streaming user playing the video game is displayed as a picture-in-picture in the live streaming interface and the live stream of the video game being played by the user is displayed in the main screen portion (e.g., full screen mode) of the live streaming interface. In one embodiment, the live video stream that includes the live view of the live streaming user may not include special effects being applied in real time at Block 402.

At Block 403, the processor receives a trigger to apply one of a plurality of special effects in real time to the video stream and at Block 404, the processor determines a first special effect of the plurality of special effects is associated with the trigger. At Block 405, the processor applies in real-time the first special effect to the video stream to generate a video stream having the first special effect.

In one embodiment, the trigger is based on an input received from the live streaming user. The processor may cause a display device to display the lens selection user interface. The lens selection user interface includes a plurality of lens selections that are associated with a plurality of special effects, respectively. The special effects include at least one of: a visual effect or a sound effect. The lens selections include a first lens selection associated with a first special effect and a second lens selection associated with a second special effect. The first and second special effects are different. In one embodiment, the lens selections in the lens selection user interface are selectable thumbnails that include previews of special effects associated the lens selections, respectively, as shown in FIG. 5A.

In this embodiment, receiving the trigger, at Block 403, includes receiving an input from a user via the lens selection user interface selecting the first lens selection. For example, referring to FIG. 5A, the live streaming user of the client device 102 selects a thumbnail associated with the first lens selection from the collection of lenses that is displayed in the lens selection user interface. In another embodiment, receiving the trigger, at Block 403, includes receiving an input from the user of a set of keys on a keyboard that is associated with the first lens selection. For example, the user may have previously stored the set of keys (e.g., key sequence: Ctrl+B+E+A+R) to be associated with the first lens selection (e.g., bear-ears hood lens in FIG. 5D). Activation of this set of keys may trigger the first lens selection to be selected. In this embodiment, the processor, at Block 404, determines that the selection of the thumbnail or the input of the set of keys is associated with the first lens selection (e.g., bear-ears hood lens in FIG. 5D) and, at Block 405, applies in real-time the first special effect to a video stream captured by a camera to generate a video stream having the first special effect. At Block 406, the processor transmits in real-time the video stream having the first special effect via the network. For example, as shown in FIG. 5D, the bear-ears hood lens is applied to the live stream video of the live streaming user which appears in the picture-in-picture portion of the user interface. At Block 407, the processor causes the live streaming interface that includes the video stream having the first special effect to be displayed on the plurality of client devices.

In another embodiment, the trigger is based on an input received from viewing user's client device via the network. In this embodiment, receiving the trigger includes receiving a selection of a display item included in the live streaming interface from one of the plurality of client devices. For example, a viewing user (e.g., viewer of the live stream) may activate, via a live streaming interface displayed on his client device 102, the display icon that is associated with a first special effect. For instance, a viewer of the live streaming interface illustrated in FIG. 5F may select the display item on the right side of the interface that is associated with a first special effect. The first special effect in FIG. 5F includes the mask being applied to the bottom half of the live streaming user's face and a red effect being applied to the live streaming user's pupils (e.g., mask-red eyes lens). In this embodiment, a user that is not the live streaming user triggers the selection of a lens to be applied to the live streaming video.

In this embodiment, the processor, at Block 404, determines that the selection of the display item is associated with the first lens selection (e.g., mask-red eyes lens in FIG. 5F) and, at Block 405, applies in real-time the first special effect to a video stream captured by a camera to generate a video stream having the first special effect. At Block 406, the processor transmits in real-time the video stream having the first special effect via the network. For example, as shown in FIG. 5F, the mask-red eyes lens is applied to the live stream video of the live streaming user which appears in the picture-in-picture portion of the user interface. At Block 407, the processor causes the live streaming interface that includes the video stream having the first special effect to be displayed on the plurality of client devices.

In one embodiment, the live streaming user may provide customized settings that associate the display item with the first special effect. The processor receives the customized setting and stores the customized setting in the database. In some embodiments, viewers may activate display items in the live streaming user interface that allow the viewers to subscribe to the live streaming user's live streams or channel on the live streaming platform. The viewers may subscribe to the user's live streams at different subscriptions tiers (e.g., 1-month subscription, 3-month subscription, 6-month subscription, etc.). In one embodiment, the live streaming user may include, in the customized setting, a lens associated with all subscription tiers or a different lens associated with each of the subscription tiers. Accordingly, when the viewer activates the display item to subscribe to the user's live streams at a specific subscription tier, the processor determines, at Block 404, the lens in the customized setting that was set to that specific subscription tier. If the processor determines that the mask-red eyes lens in FIG. 5F is associated with that specific subscription tier, the processor applies in real-time the mask-red eyes lens at Block 405 and the processor transmits in real-time the video stream having the special effect (e.g., mask-red eyes lens) via the network at Block 406. In this embodiment, the application in real-time of the mask-red eyes lens to the live stream video may be for a period of time that is set by the live streaming user which is included in the customized setting.

In another embodiment, the trigger may be based on events generated by a third-party application. For instance, receiving the trigger may include receiving the trigger from a third-party application such as an email application, a messaging application, or a telephone application. The trigger may be generated by the third-party application based on an occurrence within the third-party application. Examples of occurrences within the third-party application may include a new email notification, a new message notification, or a telephone call notification. In this embodiment, the new email notification, new message notification, or telephone call notification generates a trigger that causes a lens to be applied to the live video stream.

Another example of a third-party application is a video game. As shown in FIGS. 5D-5F, the live streaming interface may include the live video stream including a live view of a user playing the video game (e.g., in the picture-in-picture portion) and a live stream of the video game being played by the user. In this embodiment, the trigger may be generated based on the occurrence within the video game such as a predetermined action by or on the user's character. For example, if the user's character in the video game is injured, the video game may generate a trigger that causes a lens to be applied to the live video stream. For example, in FIG. 5E, the first special effect includes digital lightning bolts being applied to the live streaming user's eyes (e.g., lightning bolt eyes lens). In one embodiment, the occurrence of the user's character being injured in the video game causes a trigger associated with the lightning bolt eyes lens to be received. The lightning bolt eyes lens would be applied in real-time to the live video stream in this embodiment at Block 405.

FIG. 4B depicts another exemplary process of triggering changes to real-time special effects included in a live streaming video according to various aspects of the present disclosure. The process in FIG. 4B may be performed by the application server of the virtual camera server system 108 and/or the processor of a client device 102.

In this embodiment, once the processor causes the live streaming interface that includes the video stream having the first special effect to be displayed at Block 407, the processor receives a subsequent trigger to apply one of a plurality of special effects to the video stream at Block 408. At Block 409, the processor determines a second special effect of the plurality of special effects is associated with the subsequent trigger. At Block 410, the processor applies in real-time the second special effect to the video stream to generate a video stream having the second special effect. At Block 411, the processor transmits in real-time the video stream having the second special effect via the network, and at Block 412, the processor causes the live streaming interface that includes the video stream having the second special effect to be displayed on the plurality of client devices.

Referring to FIGS. 5E and 5F, the first special effect include digital lightning bolts being applied to the live streaming user's eyes (e.g., lightning bolt eyes lens) and the second special effect includes the mask being applied to the bottom half of the live streaming user's face and a red effect being applied to the live streaming user's pupils (e.g., mask-red eyes lens). In this example, the processor may receive a subsequent trigger at Block 408 and determine that the second special effect (e.g., mask-red eyes lens) is associated with the subsequent trigger at Block 409.

The processor may stop the first special effect from being applied in real-time to the video stream and at Block 410, the processor applies in real-time the second special effect to the video stream to generate a video stream having the second special effect. For example, the processor stops the lightning eyes lens from being applied to the live video stream in FIG. 5E and applies the mask-red eyes lens to the live video stream as shown in FIG. 5F. At Block 411, the processor transmits in real-time the video stream having the second special effect (e.g., the mask-red eyes lens) via the network and at Block 412, the processor causes the live streaming interface that includes the video stream having the second special effect to be displayed on the plurality of client devices.

In one embodiment, receiving the subsequent trigger include receiving an input from the user via the lens selection user interface selecting the second lens selection, or receiving an input from the user of a set of keys on a keyboard that is associated with the second lens selection. In another embodiment, the processor may receive a subsequent trigger via the network that indicates a selection of the second lens selection. For example, a viewing user (e.g., viewer of the live stream) may activate, via a live streaming interface displayed on his client device 102, a display icon corresponding to the selection of the second lens selection. In this embodiment, a user that is not the live streaming user triggers the selection of a lens to be applied to the live streaming video. In another embodiment, the processor may receive a subsequent trigger from a third-party application.

Examples of the live streaming interface are shown in FIGS. 5D-5F. In the embodiments illustrated in FIGS. 5E and 5F, the live streaming interface may include an icon or thumbnail associated with the lens being applied to the live streaming video of the live streaming user. In some embodiments, the icon or thumbnail may be used by viewers to download the lens. For example, the icon or thumbnail may include an embedded code that is associated with the lens. This embedded code may be activated using a camera. In another example, the icon or thumbnail may also include a selectable portion which allows the viewer to download the lens by activation (e.g., via mouse click or touch on a touch screen) of the selectable portion.

In one embodiment, the application server of the virtual camera server system 108 and/or a processor of a client device 102 may set at least one of the plurality of lens selections as preferred lens selections based on input received from a user on the lens selection user interface, and display on the lens selection user interface the preferred lens selections. For instance, the preferred lens selections may be displayed under the Favorite label as shown in FIGS. 5B and 5C.

Software Architecture

Figure 6:
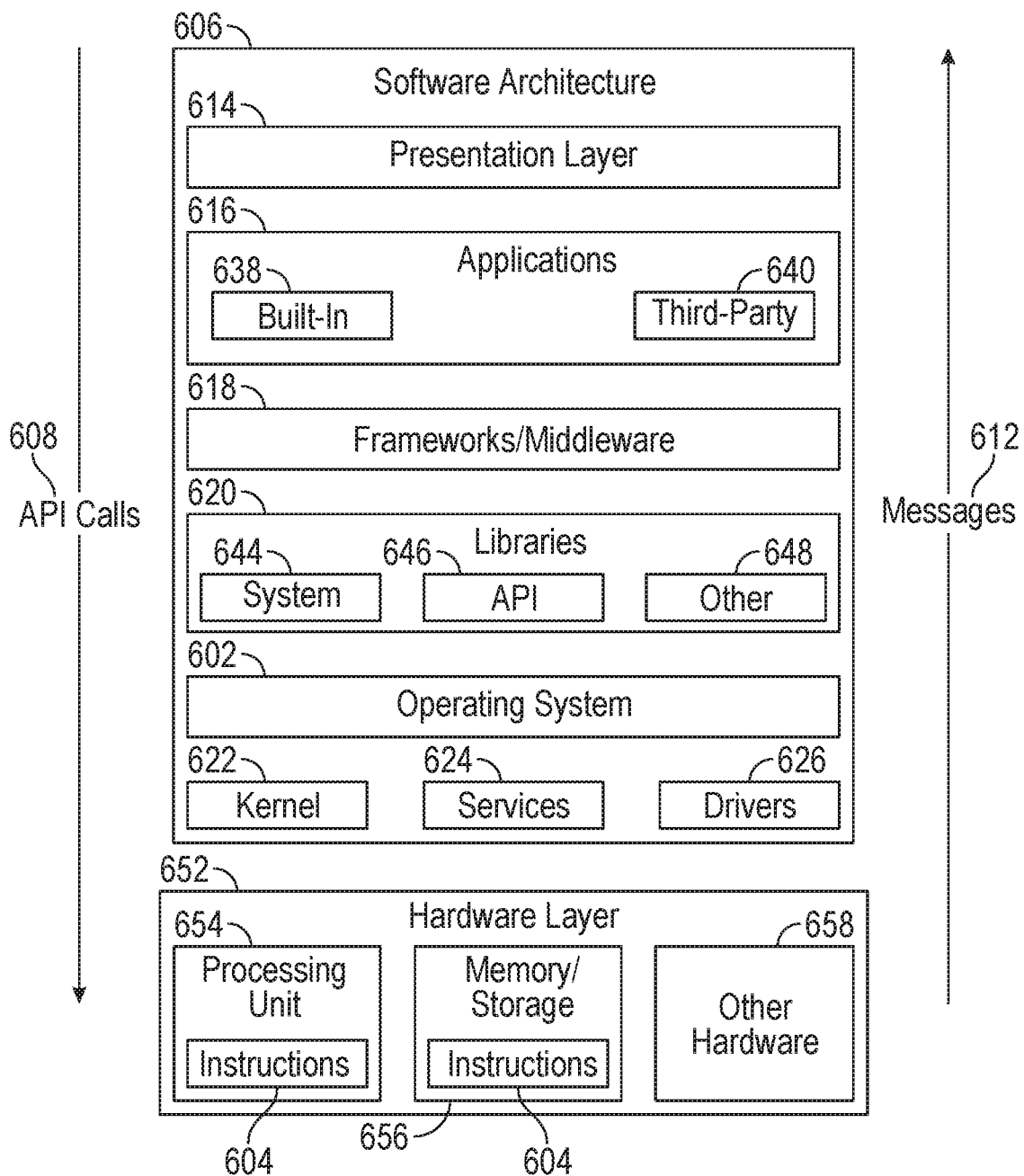
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 7:
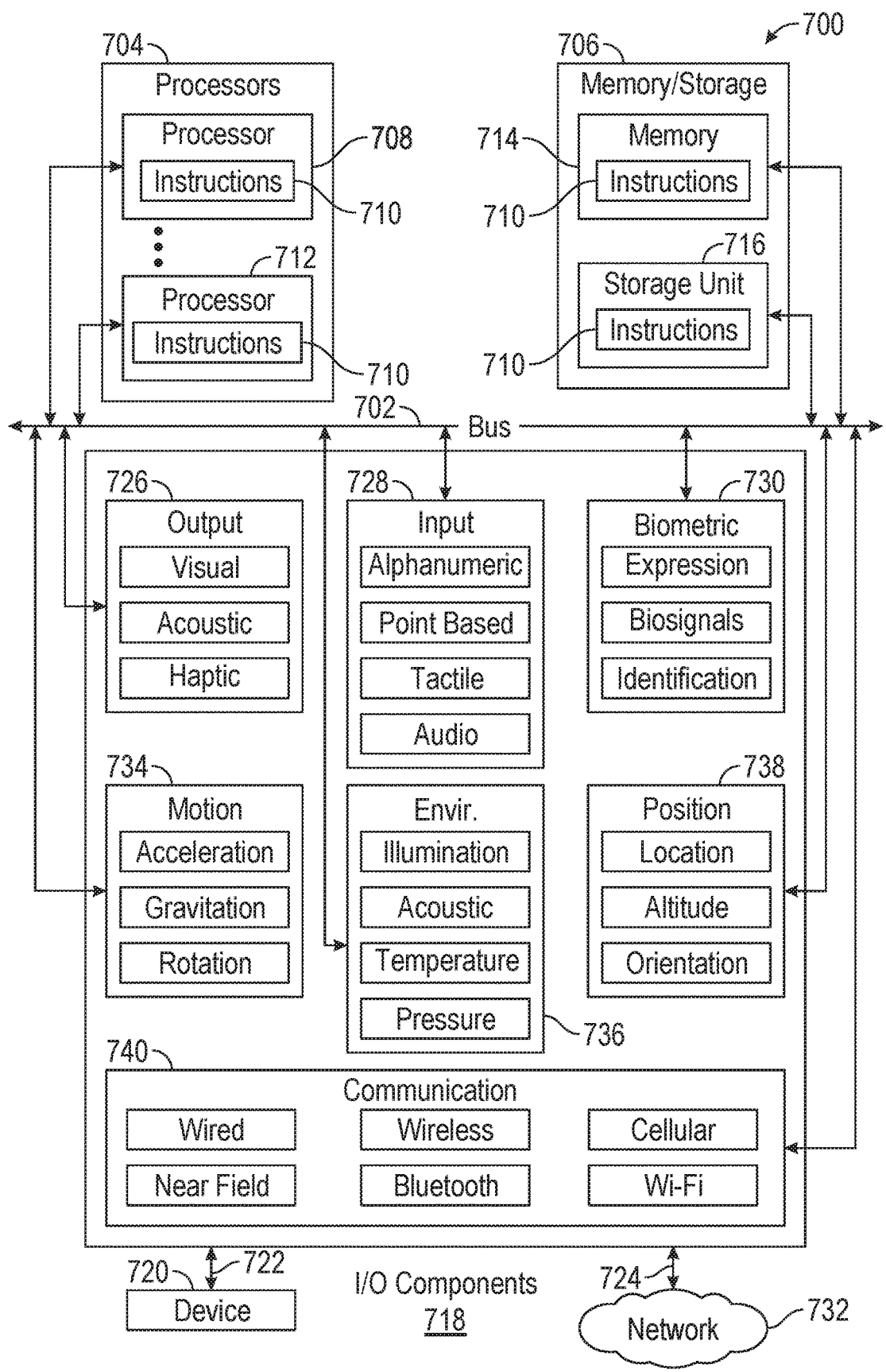
FIG. 7 is a block diagram illustrating components of a machine, according to some exemplary embodiments, able to read instructions from a machine-readable medium (e.g., a machine-readable storage medium) and perform any one or more of the methodologies discussed herein.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combination thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates and/or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A system of triggering changes to real-time special effects included in a live streaming video comprising:
   a camera to capture a video stream of a user that is transmitted in real-time to a plurality of client devices, the video stream of the user comprising images of the user;
   a display device;
   a processor; and
   a memory component having instructions stored thereon, when executed by the processor, causes the system to perform operations comprising:
   transmitting in real-time the video stream,
   causing a live streaming interface to be displayed on the plurality of client devices, wherein the live streaming interface includes the video stream and a live stream of the video game being played by the user in real-time, wherein the video stream and the live stream of a video game are displayed independently in the live streaming interface,
   receiving a trigger to apply one of a plurality of special effects to the video stream, wherein each of the plurality of special effects is an augmented reality special effect using a combination of a visual effect applied to the user's face in the video stream and a sound effect applied to audio of the video stream,
   determining a first special effect of the plurality of special effects is associated with the trigger,
   applying in real-time the first special effect to the video stream to generate a video stream having the first special effect,
   transmitting in real-time the video stream having the first special effect via the network, and
   causing the live streaming interface including the video stream having the first special effect to be displayed on the plurality of client devices.

2. The system of claim 1, wherein receiving the trigger includes:
   receiving a selection of a display item included in the live streaming interface from one of the plurality of client devices.

3. The system of claim 2, wherein determining the first special effect is associated with the trigger includes:
   determining that the first special effect is associated with the display item.

4. The system of claim 3, wherein the system to perform operations further comprising:
   receiving a customized setting that associates the display item with the first special effect.

5. The system of claim 1, wherein the system to perform operations further comprising:
   causing a lens selection user interface to be displayed on the display device, the lens selection user interface including a plurality of lens selections,
   wherein the plurality of lens selections are associated with a plurality of special effects, respectively,
   wherein the plurality of lens selections include a first lens selection associated with the first special effect and a second lens selection associated with a second special effect.

6. The system of claim 5, wherein receiving the trigger includes:
   receiving an input from a user via the lens selection user interface selecting the first lens selection, or
   receiving an input from the user of a set of keys on a keyboard, wherein the set of keys is associated with the first lens selection.

7. The system of claim 1, wherein the system to perform operations further comprising:
   receiving a subsequent trigger to apply one of a plurality of special effects to the video stream,
   determining a second special effect of the plurality of special effects is associated with the subsequent trigger,
   applying in real-time the second special effect to the video stream to generate a video stream having the second special effect,
   transmitting in real-time the video stream having the second special effect via the network, and
   causing the live streaming interface to be displayed on the plurality of client devices, wherein the live streaming interface includes the video stream having the second special effect.

8. The system of claim 1, wherein receiving the trigger includes:
   receiving the trigger from a third-party application, wherein the trigger is generated by the third-party application based on an occurrence within the third-party application.

9. The system of claim 8, wherein
   the third-party application is an email application, a messaging application, or a telephone application, and
   the occurrence within the third-party application is a new email notification, a new message notification, or a telephone call notification.

10. The system of claim 8, wherein the third-party application is the video game.

11. The system of claim 10, wherein the occurrence within the video game includes a predetermined action by or on the user's character.

12. A method of triggering changes to real-time special effects included in a live streaming video comprising:

transmitting in real-time to a plurality of client devices a video stream of a user captured by a camera, the video stream of the user comprising images of the user;

causing a live streaming interface to be displayed on the plurality of client devices, wherein the live streaming interface includes the video stream and a live stream of the video game being played by the user in real-time, wherein the video stream and the live stream of a video game are displayed independently in the live streaming interface;

receiving a trigger to apply one of a plurality of special effects to the video stream, wherein each of the plurality of special effects is an augmented reality special effect using a combination of a visual effect applied to the user's face in the video stream and a sound effect applied to audio of the video stream;

determining a first special effect of the plurality of special effects is associated with the trigger;

applying in real-time the first special effect to the video stream to generate a video stream having the first special effect;

transmitting in real-time the video stream having the first special effect via the network, and causing the live streaming interface including the video stream having the first special effect to be displayed on the plurality of client devices.

13. The method of claim 12, wherein receiving the trigger includes:
receiving a selection of a display item included in the live streaming interface from one of the plurality of client devices.

14. The method of claim 13, wherein determining the first special effect is associated with the trigger includes:
determining that the first special effect is associated with the display item.

15. The method of claim 12, further comprising:
causing a lens selection user interface to be displayed on a display device, the lens selection user interface including a plurality of lens selections,
wherein the plurality of lens selections are associated with a plurality of special effects, respectively,
wherein the plurality of lens selections include a first lens selection associated with the first special effect and a second lens selection associated with a second special effect,
wherein receiving the trigger includes:
receiving an input from a user via the lens selection user interface selecting the first lens selection, or receiving an input from the user of a set of keys on a keyboard, wherein the set of keys is associated with the first lens selection.

16. The method of claim 12, further comprising:
receiving a subsequent trigger to apply one of a plurality of special effects to the video stream,
determining a second special effect of the plurality of special effects is associated with the subsequent trigger, applying in real-time the second special effect to the video stream to generate a video stream having the second special effect, transmitting in real-time the video stream having the second special effect via the network, and causing the live streaming interface to be displayed on the plurality of client devices, wherein the live streaming interface includes the video stream having the second special effect.

17. The method of claim 12, wherein receiving the trigger includes:
receiving the trigger from a third-party application, wherein the trigger is generated by the third-party application based on an occurrence within the third-party application.

18. The method of claim 17, wherein
the third-party application is an email application, a messaging application, or a telephone application, and
the occurrence within the third-party application is a new email notification, a new message notification, or a telephone call notification.

19. The method of claim 17, wherein the third-party application is the video game.

20. A non-transitory computer storage medium, having stored thereon instructions, when executed by a processor, causes the processor to perform a method of triggering changes to real-time special effects included in a live streaming video comprising:

transmitting in real-time to a plurality of client devices a video stream of a user captured by a camera, the video stream of the user comprising images of the user;

causing a live streaming interface to be displayed on the plurality of client devices, wherein the live streaming interface includes the video stream and a live stream of the video game being played by the user in real-time, wherein the video stream and the live stream of a video game are displayed independently in the live streaming interface;

receiving a trigger to apply one of a plurality of special effects to the video stream, wherein each of the plurality of special effects is an augmented reality special effect using a combination of a visual effect applied to the user's face in the video stream and a sound effect applied to audio of the video stream;

determining a first special effect of the plurality of special effects is associated with the trigger;

applying in real-time the first special effect to the video stream to generate a video stream having the first special effect;

transmitting in real-time the video stream having the first special effect via the network, and causing the live streaming interface including the video stream having the first special effect to be displayed on the plurality of client devices.

* * * * *